United States Patent
Ingrassia et al.

(10) Patent No.: US 8,064,819 B2
(45) Date of Patent: Nov. 22, 2011

(54) SEAMLESS SWITCHING BETWEEN RADIO AND LOCAL MEDIA

(75) Inventors: Michael Ingrassia, San Jose, CA (US); Jeffery Lee, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 385 days.

(21) Appl. No.: 12/425,974

(22) Filed: Apr. 17, 2009

(65) Prior Publication Data

US 2010/0268360 A1     Oct. 21, 2010

(51) Int. Cl.
    *H04H 20/71* (2008.01)

(52) U.S. Cl. .......... 455/3.01; 455/414.1; 455/66.1; 700/94; 707/E17.009; 707/E17.102; 707/916; 709/203; 709/231

(58) Field of Classification Search .......... 455/3.01, 455/3.04, 3.05, 414.1, 66.1, 74; 700/94; 707/E17.009, E17.101, E17.102, 916; 709/203, 709/231
See application file for complete search history.

(56) References Cited

U.S. PATENT DOCUMENTS

| | | | |
|---|---|---|---|
| 4,918,531 A | 4/1990 | Johnson | |
| 7,409,205 B2 | 8/2008 | Mittal | |
| 7,421,243 B2 * | 9/2008 | Sato et al. | 455/3.01 |
| 7,647,419 B2 * | 1/2010 | Deshpande | 709/231 |
| 7,653,342 B2 * | 1/2010 | Nichols et al. | 455/3.01 |
| 7,840,178 B2 * | 11/2010 | Hellman | 455/3.02 |
| 2002/0194593 A1 * | 12/2002 | Tsuchida et al. | 725/32 |
| 2005/0153650 A1 * | 7/2005 | Hikomoto | 455/3.01 |
| 2005/0193015 A1 * | 9/2005 | Logston et al. | 707/104.1 |
| 2007/0250597 A1 | 10/2007 | Resner et al. | |
| 2008/0207137 A1 | 8/2008 | Maharajh et al. | |
| 2008/0222546 A1 * | 9/2008 | Mudd et al. | 715/765 |
| 2009/0298418 A1 * | 12/2009 | Michael et al. | 455/3.04 |
| 2010/0010648 A1 * | 1/2010 | Bull et al. | 700/94 |
| 2010/0106852 A1 * | 4/2010 | Kindig et al. | 709/231 |
| 2010/0255772 A1 * | 10/2010 | Hellman | 455/3.06 |
| 2010/0268361 A1 * | 10/2010 | Mantel et al. | 700/94 |

OTHER PUBLICATIONS

Leydon, Krispin, "Enhanced browsing and selection for media devices," IPCOM000131715D, Nov. 16, 2005.

* cited by examiner

*Primary Examiner* — Lincoln Donovan
*Assistant Examiner* — William Hernandez
(74) *Attorney, Agent, or Firm* — Kramer Levin Naftalis & Frankel LLP

(57) ABSTRACT

Systems and methods are provided for seamlessly switching media playback between a media broadcast, such as a radio broadcast, and media from a local media library. When an electronic device determines that an upcoming media item in a media broadcast is not of interest to a user, the electronic device can switch playback from the media stream to a media item from the electronic device local library. The selected local media item can be related to a previously broadcast media item to ensure continuity in the user's listening or viewing experience. The electronic device can switch away from the local media item and return to the media stream when the media stream again broadcasts media items or segments of interest to the user.

21 Claims, 5 Drawing Sheets

SEAMLESS SWITCHING BETWEEN RADIO AND LOCAL MEDIA

FIELD OF THE INVENTION

This relates to seamlessly switching between the playback of media broadcasts and locally stored media in a single electronic device. In particular, this relates to switching back and forth from media items received as part of a broadcast stream, such as a radio stream, and media items locally stored in memory of an electronic device.

BACKGROUND OF THE INVENTION

Using a radio system, a user can receive radio waves broadcast from a radio station and provide an audio output associated with the received radio waves. Similarly, an electronic device can use communications circuitry to receive media broadcasts from non-radio media or content sources. The content of a particular radio broadcast, or more generally of a media broadcast, can vary with time. For example, a media broadcast can include a succession of different media items (e.g., different songs). As another example, a media broadcast can include a succession of segments (e.g., a succession of conversations or interviews with different guests). As still another example, a media broadcast can include content provided by advertisers that is interspersed between media items.

A user, however, may not be interested in every media item provided as part of a broadcast stream. For example, a user may not like a particular song broadcast by a radio station, or may not like a particular segment of a talk radio station (e.g., the user does not like the topic or guest of the segment). As another example, a user may not be interested in content originally generated by sources other than the media source (e.g., advertisement content). Because the user has no control over the media broadcast, the user can typically only tune to a different media broadcast, or listen to or consume the broadcast content that is not of interest.

SUMMARY OF THE INVENTION

This is directed to systems, methods, devices and computer readable media for seamlessly switching the playback of media between a broadcast media stream and media locally available to an electronic device. For example, the broadcast stream can include a radio stream provided over any communications network, and the locally available media can include media locally stored in memory or storage of the electronic device, or media items available as a dedicated unicast stream (e.g., from a host device) to the electronic device.

To allow a user to only consume the media items of interest in a media broadcast, the electronic device can determine when an upcoming broadcast segment or media item is not of interest to the user, and switch the playback from the media broadcast to media items locally stored on (e.g., stored in memory) or accessible to the electronic device (e.g., available as an on-demand stream from the user's host device). The electronic device can identify the current and future media items to be broadcast using any suitable approach. In some embodiments, the electronic device can identify specific media items, broadcast segments, or broadcast elements from metadata broadcast along with the media items (e.g., Radio Data System, or RDS data), broadcast listings or schedules available from or published by one or more media sources, analysis of the audio or video provided by the content source (e.g., audio analysis to identify a song or voice), or any other approach.

The electronic device can determine which media items are of interest to a user, or are not of interest to the user using any suitable approach. For example, the electronic device can compare media items to a user preference profile generated for each user of an electronic device. The preference profile can include any suitable information, including for example metadata values describing media items of interest or not of interest (e.g., preferred or disliked genres, artists, media types), specific media items (e.g., media items in which the user has indicated a level of interest or disinterest), or any other suitable information for determining a user's media interests. The preference profile can be generated using any suitable approach, including for example monitoring a user's playback history, requesting response to a questionnaire, or any other suitable approach.

When the electronic device determines that a current or upcoming media item in a broadcast stream is not of interest to a user, the electronic device can identify an appropriate local media item to play back instead of the media stream. In some embodiments, the electronic device can apply a relevance algorithm to select a particular media item that is of interest to the user. For example, the electronic device can apply the relevance algorithm to the last media item of interest of the media stream to select a locally stored media item. This may ensure that the user is provided with a substantially coherent media consumption experience.

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
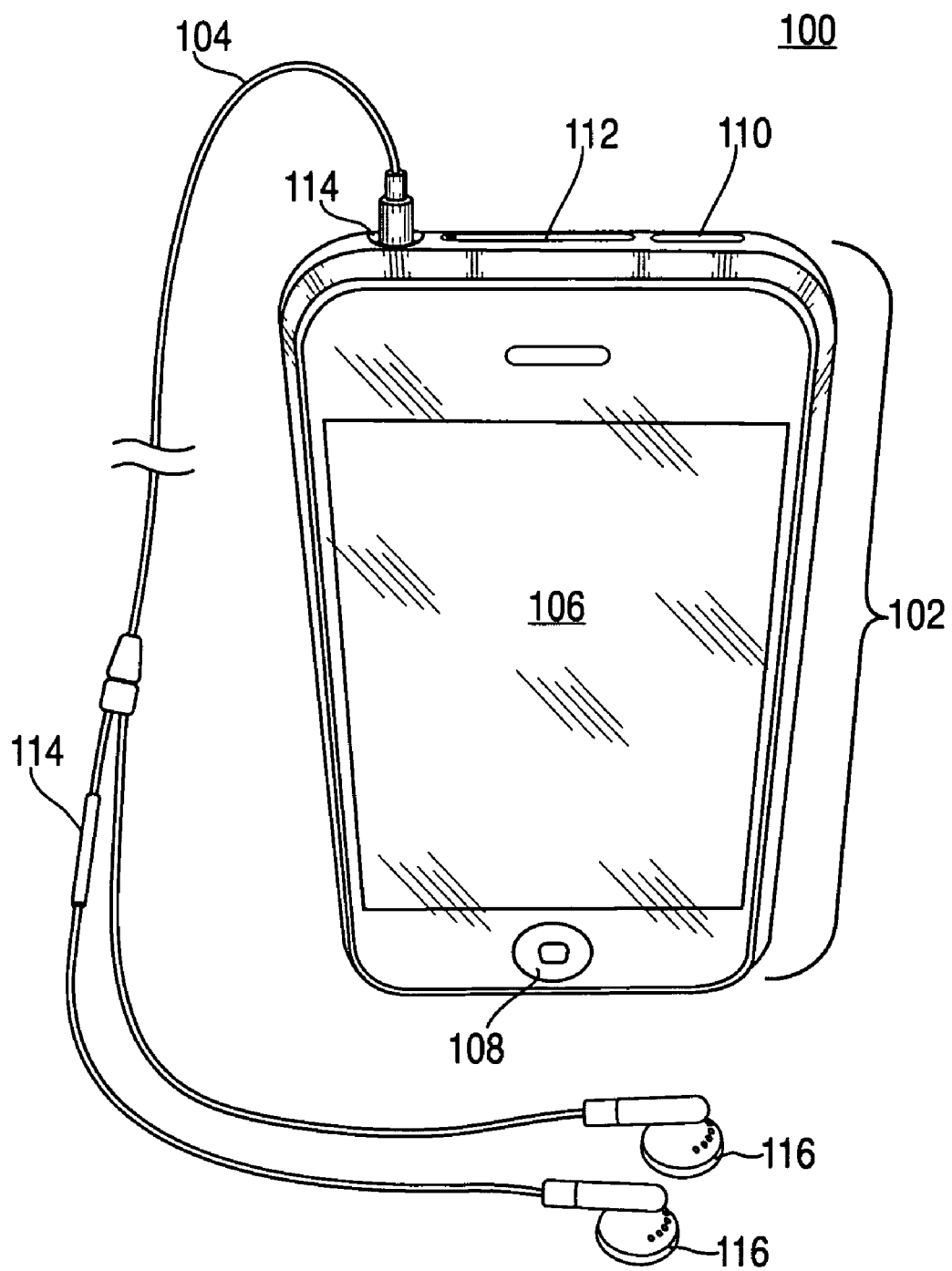
FIG. 1 is a representation of an illustrative electronic device in accordance with some embodiments of the present invention.

Using an electronic device with communications circuitry, a user can tune to and receive broadcast streams provided by media or content sources. For example, a user can direct an electronic device radio tuner to tune to a particular radio station. The radio station, or other media or content source can provide a media broadcast that includes different media items. For example, a broadcast can include several songs that are played back consecutively. As another example, a broadcast can include several talk segments each featuring different guests or hosts, or segments discussing different topics. As still another example, a broadcast can include a variety of types of segments, such as music or talk segments, news segments, weather segments, sports segments, traffic segments, segments purchased by other parties (e.g., advertisements), or any other type of segment.

When an electronic device determines that a particular media item or segment is not of interest to the user, the electronic device can seamlessly transfer the media playback from the media stream having the undesirable media item to a desirable media item retrieved from a local library. For example, the electronic device can direct audio playback circuitry to switch the audio source from the received broadcast to a media item stored in memory. The electronic device can select any suitable media item for playback, including for example a media item related to the media stream (e.g., to ensure that the media items played back remain coherent). In some embodiments, the electronic device can use a specialized algorithm applied to one or more recently played back media item of interest of the media stream to identify a related media item from the local library to play back.

The electronic device can switch back from local media to the media stream at any suitable time. For example, the electronic device can monitor the broadcast stream to determine when a desirable media item is broadcast again, and switch to the media stream in response to detecting a desirable media item. If the local media item playback is not complete when a desirable broadcast media item is detected, the electronic device can record or buffer the media broadcast and switch to the broadcast stream when playback of the local media item ends. The electronic device can play back from the buffered media broadcast, and jump back to the live broadcast at any suitable time, including for example if playback of a buffered media item ends as a desirable media item is broadcast.

As used in this application, the term media item will be understood to include any audio or video that can be broadcast by a content source and received by an electronic device for playback. For example, a media item can include music (e.g., a song), a talk show segment, an advertisement, news programming, a podcast, videos, or any other media content that may be provided to a user. In addition, it will be understood that embodiments described in the context of a radio broadcast by a radio station can also be provided using any type of media broadcast by any media or content source over any suitable communications network. Also, it will be understood that while some embodiments may be described in the context of switching between broadcast and local media items, the embodiments can also be implemented by switching between broadcast and local segments, or combinations of segments and media items.

FIG. 1 is a representation of an illustrative user device 100 that is in accordance with some embodiments of the present invention. User device 100 may generally be any device that can receive radio stations. For example, in some embodiments, user device 100 can internally have a radio tuner. In other embodiments, user device 100 can have the necessary ports to be coupled to an external radio tuner. User device 100 can then receive radio signals through the external radio tuner. For example, user device 100 can be a handheld radio, a car radio, a cellular phone, a personal data assistant (PDA), a handheld digital music player such as an iPod™ (available from Apple Inc. of Cupertino, Calif.), or a laptop or notebook computer. Although user device 100 is generally depicted as a handheld device in FIG. 1, user device 100 can also be a non-handheld device such as a desktop computer.

User device 100 can include main device 102 and one or more accessory devices 104. Generally, any of the components of user device 100 described below can be integrated into main device 102, contained in accessory device 104, or both. For example, as discussed above, a radio tuner can be integrated into accessory device 104 or integrated directly inside main device 102. Additionally, although accessory device 104 is depicted as being physically coupled to main device 102 in FIG. 1, accessory device 104 may alternatively be wirelessly coupled to main device 102.

In some embodiments, user device 100 can include display screen 106. Further to the discussion above, display screen 106 does not need to be integrated into main device 102, and in other embodiments can be an accessory device that is physically or wirelessly coupled to main device 102. Display screen 106 can include any suitable screen, such as a television screen, a computer monitor, a projection screen, a liquid crystal display (LCD) screen, or an organic light-emitting diode (OLED) screen. Display screen 106 can present various types of information to the user such as graphical and/or textual displays. This can include, for example, user-selectable options, radio station playlists, music playlists, stored videos, stored photos, stored data, and system information. In some embodiments, display screen 106 can function as a user input mechanism that allows for a touch screen or user input via a touch input (e.g., from actual or near contact of a user's finger or of a tool with the screen).

User device 100 can also include one or more of user input mechanisms 108 and 110. These mechanisms can be, for example, a keyboard, buttons, switches, track wheels, or click wheels. User device 100 can include one or more of port 112 for coupling external data and/or hard drives into user device 100. For example, port 112 can enable user device 100 to receive SIM cards, flash drives, or external hard drives. There can be multiple ways of connecting accessories devices through, for example, connector 114. Persons skilled in the art will appreciate that connector 114 can be any suitable connector such as one or more USB ports, 30-pin connector ports, dock or expansion ports, and headset jacks.

User device 100 can also include user input/output devices such as microphone 114 and speakers 116. Although depicted as being contained in accessory device 104, one skilled in the art would appreciate that microphone 114 and speakers 116 may alternatively or additionally be contained in main device 102.

Figure 2:
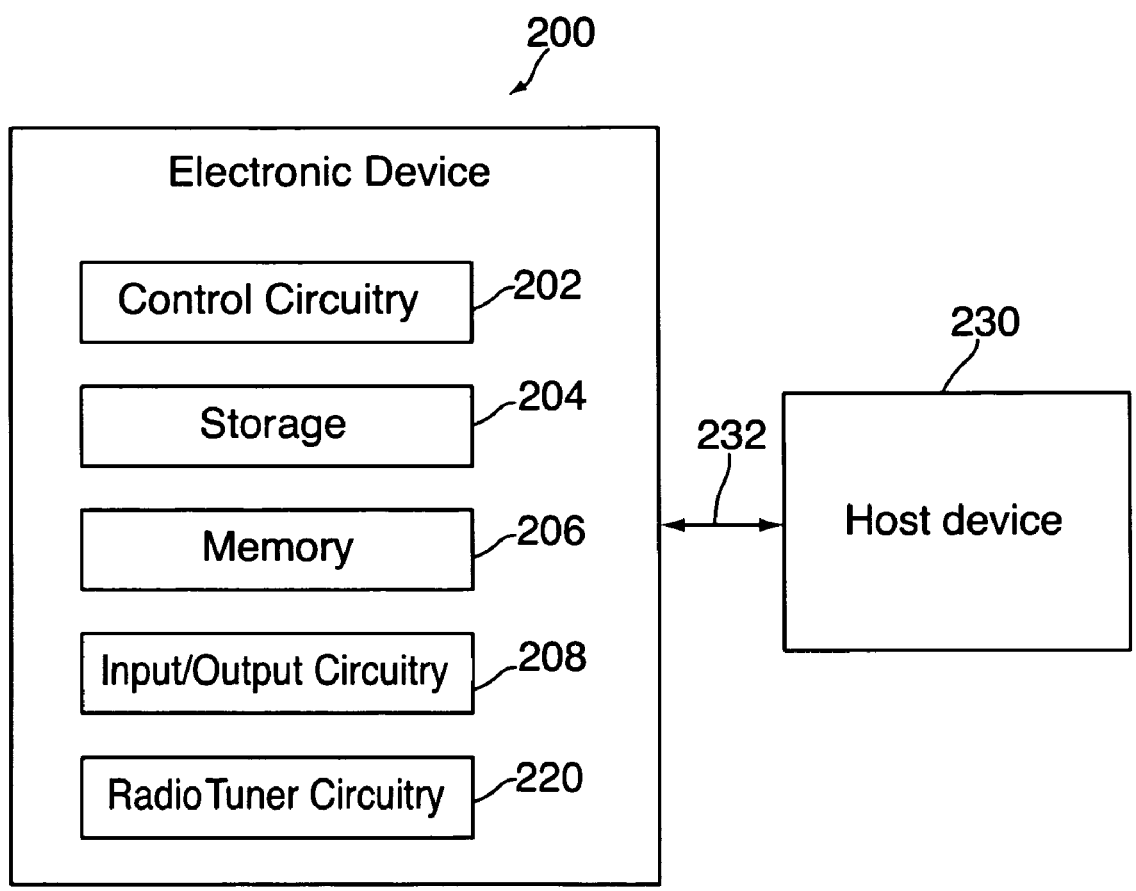
FIG. 2 is a schematic view of an illustrative electronic device coupled to a host device in accordance with some embodiments of the present invention.

FIG. 2 is a schematic view of an illustrative electronic device coupled to a host device in accordance with some embodiments of the invention. For example, electronic device 200 can correspond to user device 100 of FIG. 1. Electronic device 200 can include control circuitry 202, storage 204, memory 206, input/output circuitry 208, and radio tuner circuitry 210. In some embodiments, one or more of the components of electronic device 200 can be combined or omitted (e.g., combine storage 204 and memory 206). In some embodiments, electronic device 200 can include other components not combined or included in those shown in FIG. 2 (e.g., motion detection components, a power supply such as a battery, or a bus), or several instances of the components shown in FIG. 2. For the sake of simplicity, only one of each of the components is shown in FIG. 2.

Control circuitry 202 can include any processing circuitry or processor operative to control the operations and performance of electronic device 200. For example, control circuitry 202 can be used to run operating system applications, firmware applications, media playback applications, radio tuner applications, or any other application. In some embodiments, the control circuitry can drive a display and process inputs received from a user interface.

Storage 204 can include, for example, one or more storage mediums including a hard-drive, solid state drive, flash memory, permanent memory such as ROM, any other suitable type of storage component, or any combination thereof.

Storage 204 can store, for example, media data (e.g., music and video files), application data (e.g., for implementing functions on device 200), firmware, user preference information data (e.g., radio preset preferences), authentication information (e.g. libraries of data associated with authorized users), wireless connection information data (e.g., information that can enable electronic device 200 to establish a wireless connection), and any other suitable data or any combination thereof.

Memory 206 can include cache memory, semi-permanent memory such as RAM, and/or one or more different types of memory used for temporarily storing data. In some embodiments, memory 206 can also be used for storing data used to operate electronic device applications, or any other type of data that can be stored in storage 204. In some embodiments, memory 206 and storage 204 can be combined as a single storage medium.

Input/output circuitry 208 can be operative to convert (and encode/decode, if necessary) analog signals and other signals into digital data. In some embodiments, input/output circuitry 208 can also convert digital data into any other type of signal, and vice-versa. Although input/output circuitry 208 is illustrated in FIG. 2 as a single component of electronic device 200, several instances of input/output circuitry can be included in electronic device 200.

Radio tuner circuitry 210 can include any suitable circuitry for tuning to a particular frequency of a received radio signal. For example, by resonating at a particular frequency, radio tuner circuitry 210 can pass that particular frequency and exclude any other frequencies that were received with the radio signal. Radio tuner circuitry can communicate with input/output circuitry 208 to audibly output the particular frequency through, for example, speakers 116 of FIG. 1. In some embodiments, the electronic device can instead or in addition include communications circuitry operative to connect to other types of content sources using different types of communications networks, such as communications circuitry for connecting to satellite radio stations, Internet radio stations, dedicated broadcast sources (e.g., on-demand content sources), or any other suitable content source. For the sake of brevity, it will be understood that any suitable content source and any communications network can be used instead of or in addition to a radio station and a radio network in the following discussion.

In some embodiments, electronic device 200 can include a bus operative to provide a data transfer path for transferring data to, from, or between control processor 202, storage 204, memory 206, input/output circuitry 208, radio tuner circuitry 210, and any other component included in the electronic device.

Electronic device 200 can be coupled to host device 230 via communications path 232. Host device 230 can include any suitable type of device operative to provide power, data (e.g., media files) or both to electronic device 200. For example, host device 230 may include a computer (e.g., a desktop or laptop computer), a server (e.g., a server available over the Internet or using a dedicated communications link), a kiosk, or any other suitable device. In some embodiments, host device 230 can include a remote server, for example accessible over the Internet. Host device 230 can include any suitable communications circuitry for communication with electronic device over communications path 232.

Communications path 232 can be provided by any suitable communications circuitry operative to connect to a communications network and to transmit communications (e.g., voice or data) from electronic device 200 to host device 230, or other devices within a communications network. Communications path 232 can support any suitable communications protocol such as, for example, Wi-Fi (e.g., a 802.11 protocol), Bluetooth (registered trademark), radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol. In some embodiments, communications path 232 may be operative to receive media or data over the Internet (e.g., streaming media or downloaded media).

Figure 3:
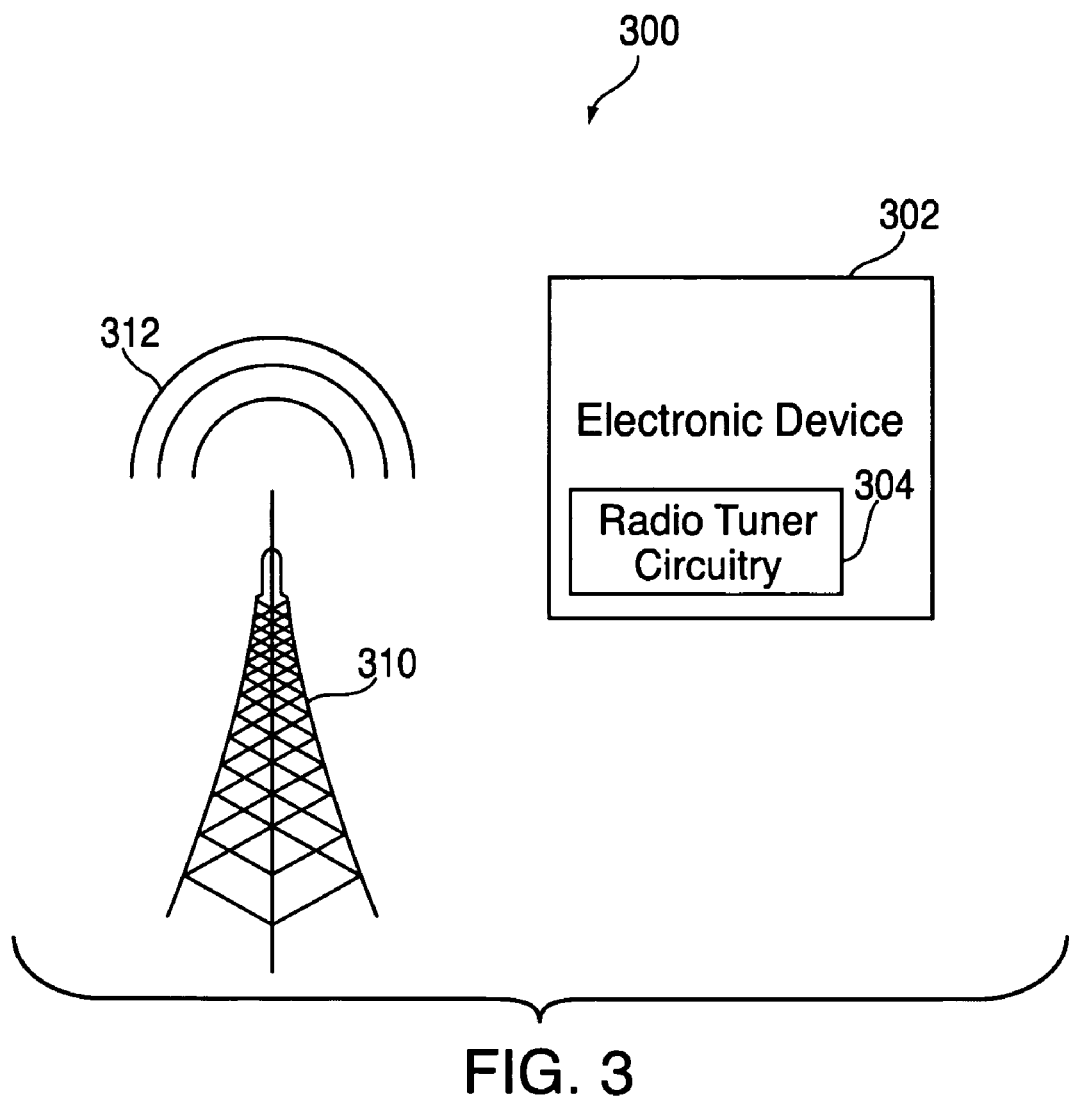
FIG. 3 is a schematic view of an illustrative system for providing and receiving radio broadcasts in accordance with one embodiment of the invention.

The electronic device can receive media streams from a variety of sources. In some embodiments, the electronic device can receive a radio stream. FIG. 3 is a schematic view of an illustrative system for providing and receiving radio broadcasts in accordance with one embodiment of the invention. System 300 can include one or more electronic devices 302 operative to receive radio station broadcasts, although only one is shown in FIG. 3 for simplicity. Each electronic device 302 can include radio tuner circuitry 304 operative to tune to and receive a radio broadcast. Radio station 310 can provide broadcast 312 of media using, for example, a AM or FM radio signal, for any electronic device 302 within the broadcast range of radio station 310. In addition to the media, radio station 310 can broadcast radio station information such as Radio Data System (RDS) information. RDS information can include, for example, digital information such as station identification, the current song's track, artist, genre, and length information, and/or alternative frequencies for particular stations.

Each media broadcast to which the electronic device can tune can include several media items or segments. Each media item or segment can be characterized by distinct metadata, such as genre, artist, title, album metadata for music; host, guest, topic for talk segments; type, sponsor for a weather, news, or advertisement segment. Each user can have different tastes, and like or dislike different media items or segments of a particular media broadcast. As a the media items or segments of a media broadcast change, the user's interest in the broadcast can also change. To ensure that a user only consumes media items or segments that are of interest to the user, the electronic device can monitor the broadcast media items and segments, and switch playback from undesirable or disliked media items and segments to locally stored or locally available media items or segments that the user likes.

The electronic device can identify a user's interests using any suitable approach. In some embodiments, the electronic device can define or access a preference profile defining a user's interests and dislikes. The preference profile can include any suitable information, including for example specific metadata describing attributes of media items or segments, listings of particular media items or segments, or any other information identifying media items or characteristics of media items or segments. The preference profile can include information describing one or both of media items or segments that a user likes and that a user dislikes.

The preference profile can be generated using any suitable approach. In some embodiments, the electronic device or another device can direct the user to respond to a series of questions from which the device can identify the user's preferences. Alternatively, the electronic device can monitor the user's playback history to identify the type of media items or segments to which the user listens (e.g., both broadcast and locally stored media items or segments) or that the user skips or tunes away from. As still another example, the electronic device can determine, from the media items or segments locally stored or available from a host device, specific media items or the types of media items of interest to the user.

The electronic device can identify a broadcast media item or segment using any suitable approach. For example, the electronic device can monitor each radio station and retrieve data describing each broadcast media item (e.g., identified from an analysis of the broadcast audio, or from metadata broadcast with the media, such as RDS, RT or RT+ data). As another example, the electronic device can access a remote database that includes a listing of the media items broadcast or to be broadcast by particular radio stations. The remote database can be provided by individual radio stations, or generated and managed by a specialized entity. As still another example, the electronic device can identify media items provided by a radio station from alternative sources of the radio broadcast, such as a counterpart Internet radio station of a terrestrial or Internet radio station. The electronic device can monitor the alternative source, or alternatively retrieve listings of broadcast media items from the alternative source (e.g., retrieve from the past ten songs broadcast from a radio station website, or determine future guests on a talk show program from a website schedule).

When the electronic device determines, after comparing an upcoming media item or segment with the user's preference profile, that the upcoming media item or segment is not of interest to the user, the electronic device can select a different media item from the electronic device library for playback. Although the following discussion will describe switching to a media item in a local library, it will be understood that the electronic device can instead or in addition switch to a unicast stream from a host device or server, or any other non-broadcast media item or segment.

The electronic device can play back any suitable number of local media items or segments after switching from a media broadcast. In some embodiments, the electronic device can continue to monitor the media broadcast from which the device switched to determine whether the broadcast includes a media item or segment that is of interest to the user. For example, the electronic device can monitor RDS data provided by the radio station and received by the radio tuning circuitry as a background process to determine whether the next media item is of interest. Because RDS data can be received within a window (e.g., a 10 second window) of the beginning of a media item, the electronic device can instead or in addition analyze the received audio stream to detect changes in tempo, pauses, a DJ voice, or other characteristic elements that separate consecutive media items or segments. The electronic device can then return to the media broadcast as soon as the subsequent media item is of interest. In some cases, the electronic device may be required to play back several locally stored media items or segments before identifying a broadcast media item that is of interest (e.g., if there is a long pause between consecutive talk show segments).

To avoid switching away from locally played back media in the middle of the media playback, the electronic device can instead determine whether, after playing back a local media item, the current media item of the media broadcast is of interest to the user. If it is, the electronic device can then return to the media broadcast. This, however, can cause the electronic device to switch to the media broadcast in the middle of the broadcast media item playback. To avoid this, the electronic device can determine, after a local media item ends, whether the current broadcast media item is both of interest to the user and whether playback is at or near (e.g., within 5 or 10 seconds) of the beginning of the media item. If the current broadcast media item is either not of interest, or that the playback is not at or near the beginning of the media item, the electronic device can continue to play back media items from a local library.

In some embodiments, to avoid switching away from locally played back media in the middle of the media playback, the electronic device can instead monitor the media stream for a media item or segment of interest, and record the stream in response to detecting the media item or segment (e.g., buffer the media broadcast). Then, when the locally played back media item ends, the electronic device can switch playback to the media broadcast buffer while continuing to record the media broadcast. The electronic device buffer can have any suitable length, including for example a length that ensures that a user can easily switch between locally stored media and broadcast media without risking missing broadcast media of interest. As another example, the buffer length can be selected based on power or memory considerations. In one implementation, the buffer can support recording a particular duration of a media broadcast at a given bitrate using a given CODEC, for example two hours using an average bitrate and CODEC.

The electronic device can manage the buffer content using any suitable approach. In particular, the electronic device can determine which content to place in the buffer, and which content to remove from the buffer when the buffer becomes full. In some embodiments, the buffer can include a circular buffer in which the memory assigned to consumed media items can be released to store upcoming media items from the media broadcast. If a user does not play back the buffered media over a duration that is within a predetermined distance (e.g., a time or amount of remaining memory) of the end of the buffer, the electronic device may manage the specific media items within the buffer.

In some embodiments, the electronic device can stop recording the broadcast media stream when the buffer is full. This can ensure, for example, that the user can listen to the media that was broadcast when the device first switched away from the media broadcast (e.g., if the user switched away because of an advertisement). Alternatively, the electronic device can replace the oldest portions of the media broadcast with more recent portions of the broadcast (e.g., treat the buffer as a circular buffer for all received broadcast media).

In some embodiments, the electronic device can instead or in addition analyze the contents of the buffer and of the received broadcast stream, and selectively remove content from the buffer, selectively store broadcast media items in the buffer, or both. For example, when the media buffer reaches a predetermined length or a predetermined distance from the buffer end, the electronic device can analyze the media items received from the media broadcast, and determine whether the received items are of interest to the user. The electronic device can then selectively buffer only the received media items that are of interest. As another example, the electronic device can analyze the media items stored in the buffer, and identify the stored media items that are of less interest to the user. The electronic device can then selectively release the memory taken by those media items, and allow newly received broadcast media items to replace the less desirable buffered media items. As still another example, the electronic device can only replace media items stored in the buffer that are less desirable than particular desirable media items from the received media broadcast.

The electronic device can use any suitable approach to ensure that the media items played back from the local library are related to the media broadcast. For example, the electronic device can analyze one or more of the last items of interest that were played back as part of the media broadcast, can select local media items that are related to those media items (e.g., using an algorithm that measures the proximity between media items). In some embodiments, the electronic device can identify related local media items based on metadata of the broadcast media items of interest (e.g., select media items that have the same artist, genre, or year as the broadcast media items). In some embodiments, the electronic device an instead or in addition retrieve and use values defining the proximity between two or more media items.

Proximity values can be determined using any suitable approach. In some embodiments, they can be determined by comparing the specific media items in a large number of libraries or playlists. For example, each of a large number of electronic device can identify, from metadata associated with each media item, the available media items stored in memory or stored on a host device from which the electronic device receives media (e.g., a computer to which a portable media device is coupled). In some embodiments, the electronic device can provide the catalogued information to a remote server that receives and processes information defining the media libraries of several electronic devices. The remote server can then determine the overlap of specific media items or attributes in different libraries or playlists, and assign a proximity value for each of the media items.

The algorithm can use any suitable attribute of the media items within the libraries to determine the proximity value. For example, the algorithm can consider metadata attributes of the media items (e.g., artist and genre). As another example, the algorithm can process media items based on the libraries in which they were found. In particular, the algorithm can identify, for each media item in a particular library, the other media items within the same library. The algorithm can in addition process user-generated playlists that include a subset of media items from a library. Because single users typically listen to media having some similarity within a single playlist, or own media items that can be categorized in one or more groupings, the algorithm can predict the similarity of media items without processing the attributes of the media items (e.g., define similarity without verifying that the defined genre is the same).

When the electronic device or remote server processes a large number of playlists and libraries provided by a large number of users or distinct electronic devices, the electronic device or remote server can identify overlaps in libraries and playlists, and thus determine which sets of media items are most related. In particular, the electronic device can identify groupings, clusters or "buckets" of media items that are commonly found in distinct libraries or playlists (e.g., buckets of related media items). Using the buckets, the electronic device can identify the particular media items of a media broadcast that are associated with buckets having at least a predetermined number of locally stored media items to determine whether a broadcast media item is of interest to the user. For example, only broadcast media items that are in a bucket having at least a particular number (e.g., absolute number such as 0, 5 or 10, percentage of local media items such as 1%, 5%, or 20%, or percentage of media bucket items such as 0.1%, 10%, or 40%) of local media items can be considered of interest. As another example, only broadcast media items that are associated with at least one of a predetermined number of the most common buckets associated with local media items can be considered of interest to the user. In some embodiments, the electronic device can define buckets based only on several playlists defined for the local media library (e.g., if information from other electronic devices is not available).

Figure 4:
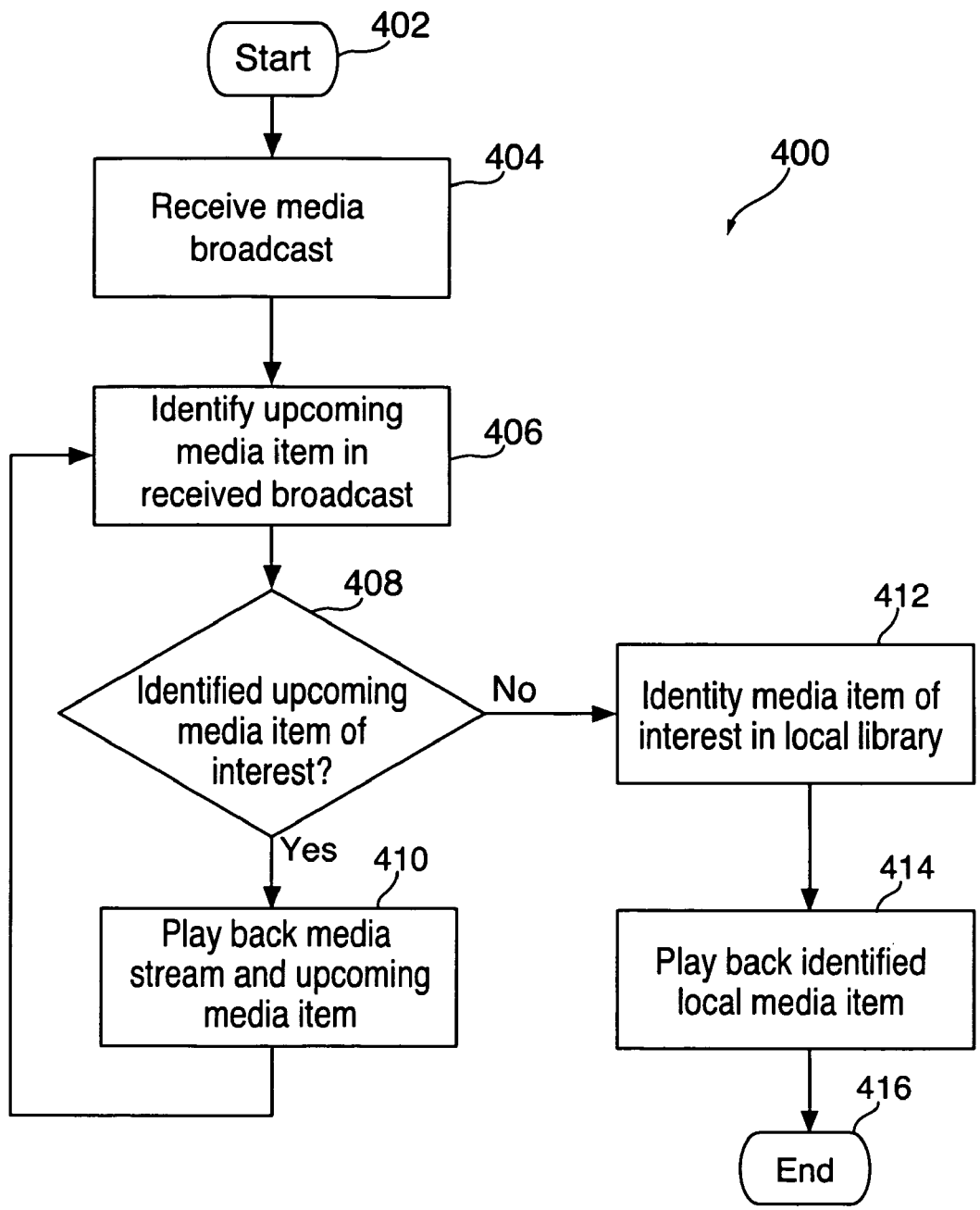
FIG. 4 is a flowchart of an illustrative process for seamlessly switching from broadcast media to local media in accordance with one embodiment of the invention.

The following flowcharts describe illustrative processes for use in identifying radio stations of interest. FIG. 4 is a flowchart of an illustrative process for seamlessly switching from broadcast media to local media in accordance with one embodiment of the invention. Process 400 can begin at step 402. At step 404, the electronic device can receive broadcast media. For example, the electronic device can direct communications circuitry to tune to a media broadcast provided by a media source (e.g., a radio broadcast). At step 406, the electronic device can identify an upcoming media item or segment of the received media broadcast. For example, the electronic device can monitor RDS data or data retrieved from a remote source, for the identity of one or more of the upcoming media items or segments. In some embodiments, the electronic device can receive information identifying specific media items, or instead or in addition metadata associated with specific media items or segments. At step 408, the electronic device can determine whether the identified upcoming media item is of interest to the user. For example, the electronic device can compare the identified upcoming media item or attributes of the upcoming media item with a user preference profile. As another example, the electronic device can determine how related or close the upcoming media item is to media items in the user's library. If the electronic device determines that the identified upcoming media item is of interest to the user, process 400 can move to step 410.

At step 410, the electronic device can play back the media stream and the upcoming media item. Process 400 can then return to step 406 and continue to identify upcoming media items in the media broadcast. If, at step 408, the electronic device instead determines that the identified upcoming media item is not of interest to the user, process 400 can move to step 412. At step 412, the electronic device can identify a media item of interest to the user in the local library. For example, the electronic device can identify a media item or segment from the user's local library (e.g., locally stored media items or media items available from a host device in communication with the electronic device) that is related to one or more of the recent broadcast media items that were of interest to the user. In some embodiments, the electronic device can apply an algorithm measuring the proximity of different media items to select a local media item that is particularly relevant or related to previous broadcast media items. At step 414, the electronic device can play back the identified local media item. For example, the electronic device can switch the playback from the media stream to the local media. In some embodiments, the electronic device can seamlessly switch playback to the local media item such that the user does not realize that the source of the media output of the device has changed (e.g., no user input is required to change the source of media). Process 400 can then end at step 416.

Figure 5:
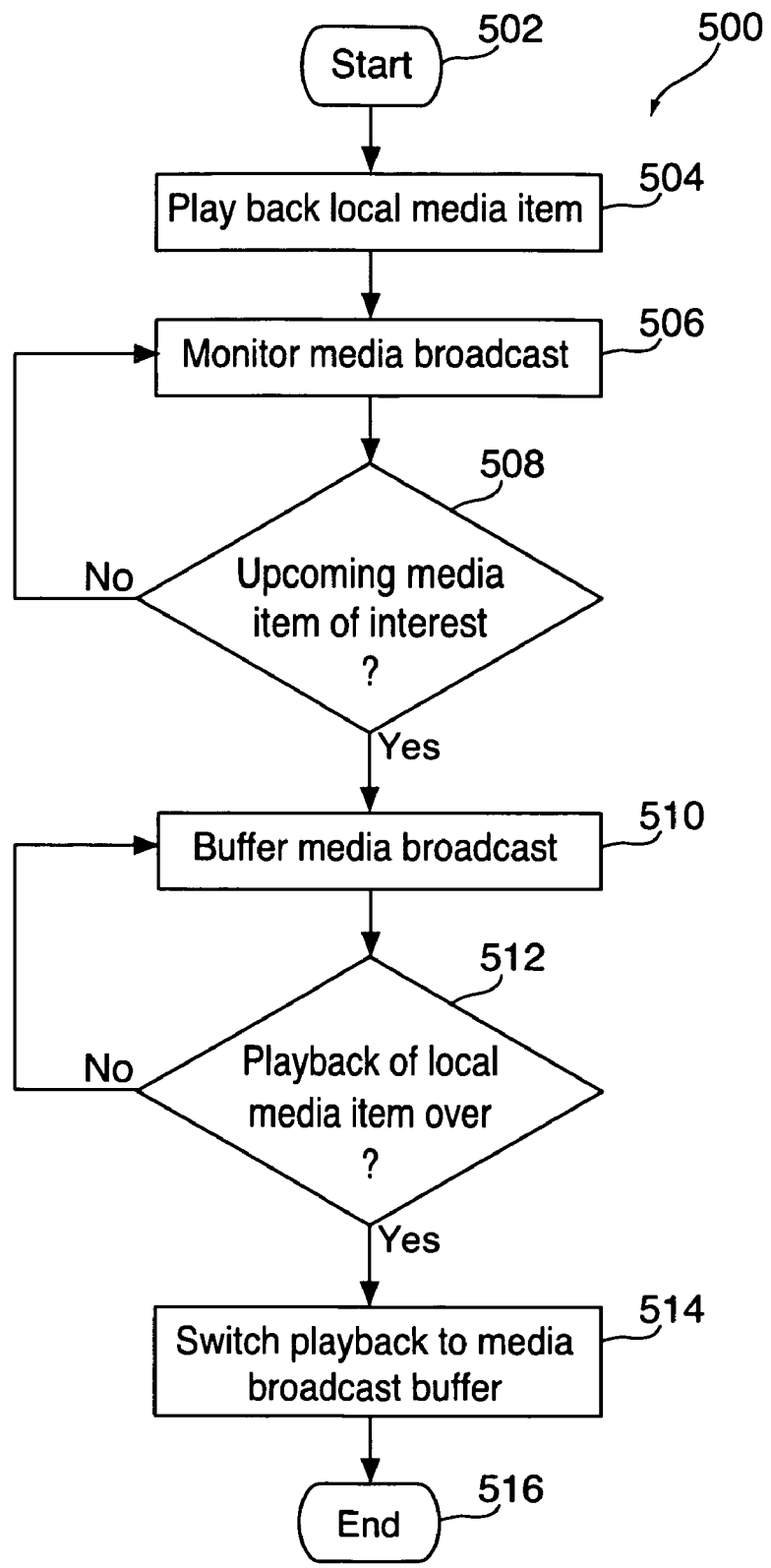
FIG. 5 is a flowchart of an illustrative process for switching media playback from local media to a media broadcast in accordance with one embodiment of the invention.

FIG. 5 is a flowchart of an illustrative process for switching media playback from local media to a media broadcast in accordance with one embodiment of the invention. Process 500 can begin at step 502. At step 504, the electronic device can play back a local media item. For example, the electronic device can play back a media item or segment from a locally stored media library, or from a host device with which the electronic device can create a communications path. At step 506, the electronic device can monitor a media broadcast of interest to the user. For example, the electronic device can monitor a media broadcast from which the electronic device switched (e.g., using process 400, FIG. 4). As another example, the electronic device can monitor a media broadcast that was identified as being of interest to the user (e.g., from a preference profile associated with the user). At step 508, the electronic device can determine whether an upcoming media item of the monitored media broadcast is of interest to the user. For example, the electronic device can monitor RDS data, or data retrieved from a remote source, for the identity of one or more of the upcoming media items or segments. In some embodiments, the electronic device can receive information identifying specific media items, or instead or in addition metadata associated with specific media items or segments. The electronic device can determine whether the identified upcoming media item is of interest to the user using any suitable approach, including for example by comparing the identified upcoming media item or attributes of the upcoming media item with a user preference profile. As another example, the electronic device can determine how related or close the upcoming media item is to media items in the user's library. If the electronic device determines that the upcoming media item is not of interest to the user, process 500 can return to step 506 and continue to monitor the media broadcast.

If, at step 510, the electronic device instead determines that the upcoming media item is of interest to the user, process 500 can move to step 512. At step 512, the electronic device can buffer the media broadcast. For example, the electronic device can store in memory (e.g., in a buffer) the received media broadcast. The buffer can have any suitable length, including for example a length that is sufficiently large for storing several broadcast media items or segments. In some embodiments, the electronic device can manage the media buffer to ensure that proper media items from the broadcast are stored in the buffer. At step 512, the electronic device can determine whether the playback of the local media item is over. For example, the electronic device can determine whether the playhead has reached the end of the media item. If the electronic device determines that the local media item is not over, process 500 can return to step 510 and continue to buffer the media stream.

If, at step 512, the electronic device determines that playback of the local media item has completed, process 500 can move to step 514. At step 514, the electronic device can switch playback from the local media to the media broadcast buffer. This can ensure that the user does not miss any relevant portion of the media broadcast, while providing a mechanism for switching the source of played back media. In some embodiments, the electronic device can continue to buffer the media stream as the electronic device plays back from the buffer. The electronic device can automatically and seamlessly switch the playback source such that the user may not realize that the playback source has changed. Process 500 can then end at step 516.

The above described embodiments of the present invention are presented for purposes of illustration and not of limitation, and the present invention is limited only by the claims which follow.

What is claimed is:

1. A method for seamlessly switching between a media broadcast and media from a local library, comprising:
    directing communications circuitry to receive a media broadcast, wherein the media broadcast comprises a plurality of media items;
    sequentially playing back the media items from the received media broadcast;
    determining that an upcoming media item of the media broadcast is not of interest to the user;
    identifying a media item from the local library that is of interest to the user; and
    automatically seamlessly switching playback from the media broadcast to the identified media item from the local library in response to determining that the upcoming media item of the media broadcast is not of interest to the user.

2. The method of claim 1, further comprising:
    receiving, from a media source, a listing of the plurality of media items.

3. The method of claim 1, further comprising:
    extracting metadata indicative of the plurality of media items from the received media broadcast; and
    establishing at least one of the identity and attributes of the upcoming media item.

4. The method of claim 3, wherein determining further comprises:
    retrieving a user preference profile; and
    applying the retrieved preference profile to the established at least one of the identity and attributes of the upcoming media item to determine whether the upcoming media item is of interest to the user.

5. The method of claim 4, wherein determining further comprises:
    identifying media items from the local library; and
    determining that the upcoming media item does not match a media item from the local library.

6. The method of claim 3, wherein identifying further comprises:
    retrieving a user preference profile; and
    applying the retrieved preference profile to media items from the local library to identify a media item from the local library that is of interest to the user.

7. The method of claim 6, further comprising:
    selecting a played back media item of interest from the plurality of media items;
    retrieving a measurement of the relatedness of media items from the local library relative to the selected media item of interest; and
    identifying a media item from the local library that has a measurement of relatedness that satisfies a proximity criteria.

8. An electronic device operative to switch between different sources of audio for playback, comprising radio tuning circuitry, memory, and a processor, the processor operative to:
    direct the radio tuning circuitry to tune to a radio broadcast;
    determine that an upcoming radio broadcast segment is not of interest to a user;
    identify a played back radio broadcast segment that was of interest to the user;
    select a media item locally stored in the memory that is related to the identified radio broadcast segment; and
    automatically switch playback from the radio broadcast to the selected media item in response to determining that the upcoming media item of the media broadcast is not of interest to the user.

9. The electronic device of claim 8, wherein the processor is further operative to:
    determine that a subsequent radio broadcast segment is of interest to the user; and
    direct the memory to store the subsequent radio broadcast segment in a buffer.

10. The electronic device of claim 9, wherein the processor is further operative to:
    detect that playback of the selected media item has ended; and
    automatically switch playback from the selected media item to the subsequent radio broadcast segment stored in the buffer.

11. The electronic device of claim 10, wherein the processor is further operative to:
    determine that several radio broadcast segments are stored in the buffer;
    determine that one of the several radio broadcast segments stored in the buffer is not of interest to the user; and skip the one of the several radio broadcast segments stored in the buffer when playing back from the buffer.

12. The electronic device of claim 11, wherein the processor is further operative to:
   detect an upcoming new segment of the radio broadcast;
   determine that the user has more interest in the detected upcoming new broadcast segment than in the several radio broadcast segments stored in the buffer; and
   automatically switch playback from the buffer to the radio broadcast.

13. The electronic device of claim 8, wherein the processor is further operative to:
   detect that playback of the selected media item has ended;
   select another media item locally stored in the memory; and
   play back the other selected media item.

14. A method for seamlessly switching between broadcast and local sources for media playback, comprising:
   receiving a media broadcast;
   determining that a media item of the media broadcast is not of interest to a user;
   identifying a previously played back media item of the media broadcast that is of interest to the user;
   selecting a media item locally stored in memory of the electronic device, wherein the selected media item is similar to the identified previously played back media item; and
   playing back the selected media item instead of the determined broadcast media item when the determined broadcast media item is transmitted as part of the media broadcast.

15. The method of claim 14, wherein selecting further comprises:
   receiving a plurality of pre-defined clusters of media items;
   identifying one of the plurality of pre-defined clusters associated with the previously played back media item; and
   determining that the media item locally stored in memory is within the identified one of the plurality of pre-defined clusters.

16. The method of claim 15, wherein determining that a media item of the media broadcast is not of interest to the user further comprises:
   identifying all of the plurality of pre-defined clusters of media items associated with the media item; and
   determining that less than a pre-determined amount of media items locally stored in memory are in any of the identified all of the plurality of pre-defined clusters.

17. The method of claim 16, wherein determining that less than a predetermined amount of media items further comprises determining that no media items locally stored in memory are in any of the identified all of the plurality of predefined clusters.

18. The method of claim 14, further comprising:
   determining that a subsequent media item of the media broadcast is of interest to the user; and
   automatically switching playback from the media item locally stored in memory to the subsequent media item of the media broadcast.

19. A computer-readable media for seamlessly switching between broadcast and local sources for media playback, the computer-readable media comprising computer-readable instructions recorded thereon for:
   receiving a media broadcast;
   determining that a media item of the media broadcast is not of interest to a user;
   identifying a previously played back media item of the media broadcast that is of interest to the user;
   selecting a media item locally stored in memory of an electronic device, wherein the selected media item is similar to the identified previously played back media item; and
   playing back the selected media item instead of the determined broadcast media item when the determined broadcast media item is transmitted as part of the media broadcast in response to determining that the media item of the media broadcast is not of interest to a user.

20. The computer readable media of claim 19, wherein the computer-readable media comprises additional computer-readable instructions recorded thereon for:
   determining that a subsequent media item of the media broadcast is of interest to the user; and
   automatically switching playback from the selected media item to the subsequent media item of the media broadcast.

21. The computer readable media of claim 20, wherein the computer-readable media comprises additional computer-readable instructions recorded thereon for:
   storing the subsequent media items of the broadcast media in a buffer; and
   automatically switching playback to the subsequent media items stored in the buffer.

\* \* \* \* \*